(12) United States Patent
Foerster et al.

(10) Patent No.: US 9,715,652 B2
(45) Date of Patent: Jul. 25, 2017

(54) MULTIPLE INFORMATION CARRIER

(75) Inventors: Matthias Foerster, Dresden (DE); André Kreutzer, Mittweida (DE)

(73) Assignee: Touchpac Holdings, LLC, New York, NY (US)

( * ) Notice: Subject to any disclaimer, the term of this patent is extended or adjusted under 35 U.S.C. 154(b) by 26 days.

(21) Appl. No.: 13/825,494

(22) PCT Filed: Sep. 21, 2011

(86) PCT No.: PCT/EP2011/066465
§ 371 (c)(1),
(2), (4) Date: Jun. 11, 2013

(87) PCT Pub. No.: WO2012/038490
PCT Pub. Date: Mar. 29, 2012

(65) Prior Publication Data
US 2013/0256419 A1    Oct. 3, 2013

Related U.S. Application Data

(60) Provisional application No. 61/384,885, filed on Sep. 21, 2010.

(30) Foreign Application Priority Data

Sep. 21, 2010   (EP) ..................................... 10075515
Oct. 13, 2010   (DE) .................... 20 2010 014 408 U

(51) Int. Cl.
*G06K 19/06*    (2006.01)
*G06K 19/08*    (2006.01)
(Continued)

(52) U.S. Cl.
CPC ..... *G06K 19/083* (2013.01); *G06K 19/07766* (2013.01); *G06K 19/07769* (2013.01);
(Continued)

(58) Field of Classification Search
CPC ......... G06K 19/07749; G06K 19/0723; G06K 19/072; G06K 19/067; G06K 19/07743;
(Continued)

(56) References Cited

U.S. PATENT DOCUMENTS 6,744,367 B1 * 6/2004 Forster ........................ 340/572.7
8,497,850 B2    7/2013 Foerster et al.
(Continued)

FOREIGN PATENT DOCUMENTS

DE    10 2006 052517 A1    5/2008
WO    WO 2005027032 A1 *  3/2005    ............. G06K 19/06
(Continued)

OTHER PUBLICATIONS

PCT/EP2011/066465 International Search Report & Written Opinion mailed Jan. 12, 2011.

*Primary Examiner* — Claude J Brown
(74) *Attorney, Agent, or Firm* — Wolf, Greenfield & Sacks, P.C.

(57) ABSTRACT

The invention describes a multiple information carrier having at least one electrically conductive layer and an electorally non-conductive substrate, wherein at least one first electrically conductive layer in the form of a touch structure, and second electrically conductive layer in the form of an antenna, are present in places on the substrate.

15 Claims, 15 Drawing Sheets

(51) Int. Cl.
*G06K 19/077* (2006.01)
*H01Q 1/22* (2006.01)
*H01Q 9/28* (2006.01)

(52) U.S. Cl.
CPC ..... *G06K 19/07786* (2013.01); *H01Q 1/2225* (2013.01); *H01Q 9/285* (2013.01)

(58) Field of Classification Search
CPC ....... G06K 19/07767; G06K 19/07769; G06K 19/07786; G06K 19/083; G06Q 20/341; G06Q 20/352; G06B 13/2437; H01Q 1/2225; H01Q 1/285
See application file for complete search history.

(56) References Cited

U.S. PATENT DOCUMENTS

| | | |
|---|---|---|
| 8,622,307 B2 | 1/2014 | Thiele et al. |
| 9,098,158 B2 | 8/2015 | Foerster et al. |
| 2006/0208066 A1 | 9/2006 | Finn et al. |
| 2006/0256090 A1 | 11/2006 | Huppi |
| 2008/0103890 A1* | 5/2008 | Lulic et al. ................ 705/14 |
| 2008/0106415 A1* | 5/2008 | Sellew et al. ............ 340/572.1 |
| 2008/0135629 A1* | 6/2008 | Douglas ........................ 235/492 |
| 2008/0319912 A1* | 12/2008 | Faith et al. ..................... 705/65 |
| 2009/0283886 A1* | 11/2009 | Yamazaki ..................... 257/679 |
| 2010/0026461 A1* | 2/2010 | Merchan et al. ............ 340/10.1 |
| 2010/0032487 A1 | 2/2010 | Bohn et al. |
| 2010/0045627 A1 | 2/2010 | Kennedy |
| 2010/0066511 A1* | 3/2010 | Barnett et al. ............ 340/10.51 |
| 2011/0253789 A1 | 10/2011 | Thiele et al. |
| 2011/0284640 A1 | 11/2011 | Mullen et al. |
| 2012/0019363 A1* | 1/2012 | Fein ............................ 340/10.1 |
| 2012/0125993 A1 | 5/2012 | Thiele et al. |

FOREIGN PATENT DOCUMENTS

| | | |
|---|---|---|
| WO | WO 2007/146779 | 12/2007 |
| WO | WO 2010/043422 | 4/2010 |
| WO | 2010/051802 A1 | 5/2010 |

* cited by examiner

MULTIPLE INFORMATION CARRIER

CROSS-REFERENCE TO RELATED APPLICATIONS

This is the U.S. national stage of International application PCT/EP2011/066465, filed Sep. 21, 2011 designating the United States claiming the benefit of US provisional application U.S. 61/384,885, filed Sep. 21, 2010 and priority to European application EP 10075515.6, filed Sep. 21, 2010, and German application DE 20 2010 014 408.6, filed Oct. 13, 2010.

The invention relates to dipole antennas and a method for producing the same, and to uses of such antennas.

In the prior art, information carriers or data carriers are described which serve for storing data/information. The information on said carriers are preferably read by means of capacitive readers. Disadvantages of the readers or apparatuses disclosed in the prior art are that for the individual applications, separate capacitive readers always have to be available and they are often connected to data processing media via an interface. Because of this, distribution and acceptance of readers is relatively poor and purchasing the readers is associated with additional costs. Moreover, linking real printed information with digital information is very difficult to implement. One possibility are barcodes which can be acquired by means of suitable scanners or cameras and can call up digital contents. The disadvantage of known barcodes is that they are associated with the system-typical handicaps and, e.g., information can be copied at will, they visually take up space on products or advertising media, they are difficult to individualize in sufficiently good quality, a direct visual contact between code an acquisition unit is required, which due to dirt, scratches, light conditions etc. make a correct acquisition and readout difficult or can completely obstruct it. Previously known capacitive data carriers always bridge within a reader between (at least) one reading and one receiving electrode. Depending on the presence or absence of a capacitive structure, a logic "1" and/or "0" is recognized.

The prior art shows a plurality of possibilities to produce information carriers by means of printing technologies or other coating methods, which information carriers can be read by means of suitable reading methods or readers (e.g., U.S. Pat. No. 3,719,804). The probably most common information carriers produced in such a manner are barcodes in the embodiment as a one-dimensional barcode or, for example, as two-dimensional variants. They are acquired with suitable optical scanners and, if required, further processed via adequate data processing systems.

Furthermore, EP 1 803 562 describes a method for transferring imaging layers from one carrier film or transfer film onto print sheets in a sheet-processing machine. Here, an adhesive is applied in a first application station and is brought together with a transfer film in a further coating station, and material from the transfer film is applied onto the print sheet by means of adhesion. In the process of this, a transfer gap is formed in the application station, and along the surface of a press roll, the transfer film is placed with the side that is coated with transfer material onto a print sheet, and is fed under pressure together with the print sheet through said transfer gap so that the imaging layers are transferred in areas covered with adhesive from the carrier film onto the print sheet so as to adhere thereon. With this, barcodes and alphanumeric information can be readily applied.

Moreover, DE 10 2008 013 509 A1 describes a steganographic method wherein security features can be generated in printed products by means of transfer film technology. Verifying the features takes place optically by means of decoders.

Furthermore, DE 10 2006 031 795 A1 discloses a security feature which has been generated by means of transfer film technology. In this method, resistors or resistor networks are introduced in printed products which shall represent a security feature. Verification takes place through contact by means of a reader which measures the resistances according to the ohmic principle.

The printed matter DE 10 2004 007 458 A1 describes a method for producing RFID labels, and the printed matter DE 10 2004 019 412 A1 describes a method for printing electrical and/or electronic structures and a film for the use in such a method. Both printed matters mention the possibility of using sheet-fed offset machines and/or web-fed offset machines for producing electrically conductive structures.

The printed matter DE 2007 026 720 A1 discloses a method and means for generating self-adhesive RFID antennas and methods for producing the same. Therein, among other things, the use of an aluminum film having a thickness of 1-20 μm is described, which film is punched out from a sheet-like carrier and weeded in a special purpose machine with the aid of tools (punches).

In addition, DE 10 2005 042 44 B4 describes an arrangement for an RFID transponder antenna consisting of two galvanically decoupled structures. This concerns, on the one hand, an impedance-adjusting structure and, on the other, a resonant structure, which can be produced on different substrates so as to ensure particularly efficient productions. Known production methods are conventional methods such as, for example, printing, etching and laying techniques, as they are prior art for RFID antennas.

The antenna is immediately ready to receive the RFID chip by means of an adhesive or soldering techniques and thus forms a complete RFID antenna with transponder chip. This has a plurality of disadvantages specifically in terms of applying the chips because the relatively large resonance-adjusting structures, the actual dipole antennas, run through the loading machines and reduce their speed.

The disadvantage of the carriers disclosed in the prior art is that they can be read only by a special reader or reading device. In addition, no carrier is described that can be interpreted by different readers or reading devices.

It is an object of the invention to provide a carrier for storing information/data, which is simple and can be produced in an economically advantageous manner, and which does not exhibit the disadvantages of the carriers described in the prior art.

The object is achieved by the independent claims. Advantageous embodiments arise from the sub-claims.

It was completely surprising that a multiple information carrier comprising at least one electrically conductive layer and an electrically non-conductive substrate can be provided, wherein at least one first electrically conductive layer as a touch structure and a second electrically conductive layer as an antenna are present in certain areas on the substrate. The information carrier or a group of the information carriers can preferably be used as a multi-readable information carrier, whereby the information carrier and the group of information carriers can be interpreted through different technologies and therefore are universally usable. It can be advantageous here if the first and the second layers of the information carrier are read together or separately. It was completely surprising that an information carrier is provided that is used for the purpose that both layers, the touch structure and the antenna, can be read using a reading method. This can involve, for example, a device comprising an area sensor. Furthermore, it can be preferred that the first and second layers contain the same or different information.

In the meaning of the invention, an information carrier is in particular a medium for storing, imaging, filing and/or assigning information. In the meaning of the invention, an antenna designates in particular a device or a means for transmitting and/or receiving electromagnetic waves. Accordingly, an information carrier is provided that, on the one hand, e.g., can store information, and on the other, can function as an antenna.

According to a preferred embodiment of the invention, on an electrically non-conductive substrate, at least one electrically conductive layer is arranged as a touch structure and preferably comprises a touch point, a coupling surface and/or a conductor path.

In the meaning of the invention, a coupling surface is in particular an electrically conductive area on the substrate. The coupling surface represents a preferred variant of the information carrier according to the invention which, for example, makes it possible to couple to external electrical capacitances, which are not part of the touch structure, and thus to increase the effective electrical capacitance of the touch structure of the information carrier. As a result, the information carriers can be read in a particular secure and reliable manner. This can take place when a person touches or approaches it and also through coupling by an article.

Conductor paths preferably consist of an electrically conductive layer and preferably establish an electrical connection between two or a plurality of subareas.

It was completely surprising that a touch structure and an antenna can be applied onto an information carrier, wherein both electrically conductive layers are present in certain areas on an electrically non-conductive material. The term "in certain areas" describes in the meaning of the invention that the first and the second layers do not cover the substrate completely, but are applied in a structured manner. Through the inventive combination of these two properties, electrical conductivity and structure, it could surprisingly be achieved to arrange a touch structure and an antenna on a substrate and to provide a multiple information carrier in this manner.

Advantageously, in a preferred embodiment, the substrate consists of a plastic, a paper, a cardboard, a wooden material, a composite material, glass, ceramics, textiles, leather or a biodegradable plastic, at least one cellulose derivative, a starch derivative and/or a combination thereof. Particularly advantageous are naturally degradable substrates or a combination thereof. The substrate is in particular an electrical non-conductive substance which is preferably flexible and has a low weight. Translucent or opaque substrates can be used. Preferred plastics comprise in particular PVC, PETG, PV, PETX, PE and synthetic papers. With the preferred substrate, an information carrier can be provided that can be produced in a cost-effective manner by means of mass-production methods and has a low weight. In addition, in a preferred embodiment, the information carrier can be configured as a flexible information carrier, the functionality of which is not even impaired by deformations (such as, for example, buckling or bending).

It is preferred that the electrically conductive layer is a metal layer, a layer containing metal particles, a layer containing electrically conductive particles, an electrically conductive polymer layer, or a layer consisting of at least one combination of these layers. Electrically conductive particles are in particular soot or graphite particles. In the meaning of the invention, polymers designate in particular a substance that is composed of a collective of chemically uniformly structured macromolecules (polymer molecules) which, however, usually differ with regard to the degree of polymerization, molar mass and chain length. The polymers are preferably electrically conductive. In such substances with uniform polymers, all macromolecules are preferably structured identically and differ only in term of their chain length (degree of polymerization). Such polymers can be designated as polymer homologs. Polymers can be selected from the group comprising inorganic polymers, metallo-organic polymers, fully or partly aromatic polymers, homopolymers, copolymers, biopolymers, chemically modified polymers and/or synthetic polymers. Particularly preferred are polymers selected from paraphenyle, polyacetylene, polypyrrole, polythiophene, polyaniline (PANI) and PEDOT. Thus, the information carrier can be produced in a cost-effective manner by means of a mass-production method.

Since the touch structure, comprising touch point, conductor path and/or coupling surface, and the antenna preferably consist of the same or a similar electrically conductive material, an information carrier can preferably be produced by using a technological method. It is preferred that the first and second layers are layers generated on the substrate by means of an additive, semi-additive and/or subtractive method. This means, both layers of the information carrier are preferably produced with one method. This is a significant advantage over the prior art since hereby, the information carrier can be produced in an easy and economically advantageous manner. According to a further preferred embodiment, the electrically conductive layer is implemented by using a subtractive method, wherein areas of layers are removed. For this purpose, known ablation methods using etching or laser are used. In the latter case, the material to be removed is vaporized through the action of the laser beams. Of course, further methods can also be used. Suitable methods preferably are planographic printing, relief printing, gravure printing and special printing methods. Particularly preferred are offset, flexo and inkjet methods.

According to a further preferred embodiment, the electrically conductive layer can be implemented by using a subtractive method, wherein layer areas are removed. For this purpose, known ablation methods using etching or laser are used. In the latter case, the material to be removed is vaporized through the action of the laser beams. Of course, further printing methods known to the person skilled in the art can also be used.

It is also preferred that the information carrier is produced by means of a transfer method. Preferably, applying the touch structure and the antenna onto the substrate can be carried out by transfer methods that are known per se; preferably, this concerns the transfer film method and particularly preferred a cold film transfer method. Such methods are known to the person skilled in the art and he/she knows that it is possible by means of a printing method to apply a substance (such as, e.g., a touch structure or antenna) onto a substrate in a structured manner, in particular in certain areas (e.g., U.S. Pat. No. 3,719,804). Here, the substrate is not covered over the entire surface by the touch structure and the antenna, but the touch structure and the antenna are applied only on certain areas of the substrate. Of course, other methods for a structured application of the electrically conductive layers can also be used.

The touch structure can advantageously be read with a capacitive area sensor which, in the meaning of the invention, can also be designated as touch-sensitive screen or touchscreen. It is preferred that the area sensor comprises at least one capacitive display. The area sensor can also be accommodated in an electrical device, wherein the device containing the area sensor is selected from the group comprising smartphones, cell phones, displays, tablet PCs, tablet notebooks, touchpad devices, graphics tablets, television sets, PDAs, MP3 players, trackpads and/or capacitive input devices, without being limited thereto. A capacitive area sensor, for example, can also be an integral part of input devices as a touchscreen, touchpad or a graphics tablet. Touchscreens are also known as tactile screens or touch-sensitive screen. Such input devices are used in smartphones, PDAs, touch displays or notebooks, amongst others. An area sensor does not necessarily have to be located in front of a display. For example, said area sensor can also be configured and used as a keyboard. Besides a click function, a drag-and-drop operation can also be carried out. Furthermore, it is also possible to use a plurality of simultaneous touches in the form of a so-called "multi-touch" for rotating or scaling displayed elements, for example. The area sensor is preferably implemented here as so-called projected capacitive touch technology (PCT). Variants of the PCT technology are, for example, "mutual capacitance" and "self capacitance", which can be implemented as mutual-capacitance screen and self-capacitance screen.

In the prior art, such a touchscreen comprises in particular an active circuit, the touch controller, which is connected to a structure of electrodes. These electrodes are usually divided into transmitter and receiver electrodes. The touch controller controls the electrodes preferably in such a manner that a signal is transmitted between in each case one or a plurality of transmitter electrodes and one or a plurality of receiver electrodes. In the idle state of the touchscreen, the signal remains constant, for example. The purpose of a touchscreen described in the prior art is in particular detecting fingers or special input devices and their position on the surface of the touchscreen. Here, introducing, e.g., a finger effects that the signal between the electrodes is changed. Usually, the signal strength is reduced because the finger placed thereon absorbs a portion of the signal from the transmitter electrode, and therefore a weaker signal arrives at the receiver electrode.

An advantageous property of the touch structure is the conductivity thereof. If instead of a finger, a preferred information carrier having the touch structure is brought in contact with an area sensor, the conductive areas preferably cause the same effect as a finger. However, the conductive structure is structured area by area because, on the one hand, the effect that is comparable to introducing a finger is to be maximized at certain positions, in particular the touch points, so as to be recognizable for the touch controller in the best possible manner. Thus, advantageously, the touch structure becomes evaluable for a data processing system connected to the area sensor.

It is known to a person skilled in the art that an input on a touchscreen or an area sensor can be carried out by means of one or a plurality of fingers (single- or multi-touch). The technology of area sensors and the principles of input or, respectively, through which of the properties of a finger an input takes place, are also known to the person skilled in the art. For example, apart from the electrical properties of the finger (e.g., conductivity), density, pressure of the input, or distance from the area sensor can also influence the input. By structuring the conductive area, the preferred information carrier achieves the same effect on an area sensor as a finger, namely an input on a position on the area sensor, which position is defined by the conductive areas of the information carrier. Thus, the person skilled in the art would be able without major experimental efforts to implement the touch structure of the information carrier in such a manner that the properties thereof are simulated, and an input on an area sensor can be achieved with the electrically conductive areas of the information carrier.

In one example, without being limited thereto, of a preferred information carrier in interaction with a so-called touchscreen having an electrode arrangement in the form of a grid, a suitable structuring of the touch point, for example, is a circle with a diameter of from 1 to 20 mm, preferred 4 to 15 mm, and particularly preferred 6 to 10 mm. Since a touchscreen is suitable for determining the position of fingers, a touch point of an information carrier can be determined by the touchscreen in the same manner. The touchscreen or the area sensor is advantageously not able to differentiate if the input was carried out by the touch structure of an information carrier or by a finger.

It can be preferred to apply a plurality of touch structures on the information carrier according to the invention. Advantageously, shape, orientation, quantity, alignment, distance and/or position of subareas, preferably the touch points of the touch structure, can be used for storing information.

On the information carrier, preferably, information is stored in the form of the touch structure that can be configured as a subarea. When the information carrier contacts or approaches the area sensor, the information can be read via the latter, wherein the capacitance is in particular partially changed.

The touch structure forming the information, i.e., the subareas of an area, consists of an electrically conductive material. It is preferred that the first and the second layer are present on the substrate in a structured manner as a point, straight line, curve, area and/or combinations thereof. In a preferred embodiment, the first and second layers are arranged on the substrate in a spatially separated, overlapping or congruent manner. Advantageously, the first and second layers consist of corner points and/or fill areas defined by curves, for example, rectangles, circles or similar figures. The spatial relations of the subareas to each other (orientation, quantity, alignment, distance and/or position) and/or the shape of the subareas preferably represent the information. When positioning the information carrier at the area sensor, the touch structure, preferably the conductor paths, more preferably the coupling surface and most preferably the touch points are interpreted as finger input so that from the subareas of the touch structure, in particular the touch points, the encoded information can be determined, for example in the form of a binary coded number, without being limited thereto. Moreover, an information carrier can in particular be determined in that the interaction between the information carrier and the area sensor, which interaction is determined by the area sensor, thus, the geometry itself, which is given through the touch structure of the information carrier, represents a code in the coding system. Positioning can also be carried through a movement of the information carrier relative to the area sensor. It is preferred that the area sensor, in a movement relative to the information carrier, progressively receives complete or partial information from the information carrier. In this connection it is also possible that different events are generated in dependence on the positions of the information carrier with respect to the area sensor. Essential for this is, for example, the direction of movement or the residence time of the information carrier with respect to the area sensor.

The antenna, which is applied as an electrically conductive layer onto the electrically non-conductive substrate, is preferably an UHF antenna (UHF=ultra-high frequency) or HF antenna (HF=high frequency), in particular a dipole antenna, comprising two spaced dipole ends. Advantageously, through the arrangement of the antenna on the substrate and the preferred configuration of the antenna, while using little material, a maximum range can be achieved. Surprisingly, the structure of the antenna is capacitively evaluable.

The antenna according to the invention comprises in particular a structure in the form of the antenna, advantageously in the form of an RFID antenna. In the meaning of the invention, RFID designates in particular an identification by means of electromagnetic waves (radio frequency identification). As is well known, such an RFID system consists substantially of a transponder, a transmitter/receiver unit for the data of the transponder, and a data processing unit. The transponder preferably has a chip with an analog and a digital circuit structure, and an antenna structure. Advantageously, the antenna structure can comprise a plurality of components, for example a resonant and/or an impedance-adjusting structure. They can be located on one carrier or on different carriers.

It is preferred that a readable means selected from the group comprising an inductive, acoustic, magnetic, electromagnetic and/or optical means is applied onto the substrate. Said means, which can also be designated as basic technology, can preferably be configured as readable codes which, for example, can be read optically through certain wavelengths (e.g., from the ultraviolet or infrared spectrum). Moreover, the codes can be configured in a 2-dimensional or 3-dimensional manner so that they can be read by suitable readers or area sensors. The readable codes preferably comprise barcode, QR code, Aztec code, augmented reality tags, antishoplifting tags according to a radio frequency method (RF tag), antishoplifting tags according to an electromagnetic method (EM tag), antishoplifting tags according to a harmonic method, antishoplifting tags according to an acousto-magnetic method (AM tags) and RFID tags. However, other readable inductive, acoustic, magnetic, electromagnetic and/or optical codes or means known to the person skilled in the art can also be present on the substrate. Hereby, the possibilities for reading the information carrier or carriers of the product are increased. At the same time, a selective information distribution among different information carriers is possible. This can advantageously be used for product security, product tracking and/or for increasing sales.

Thus, it is possible in a simple manner to provide a multiple information carrier, wherein the different range of the further readable means and the associated basic technology are a further positive criterion of the multiple information carrier. It is therefore possible to completely or selectively detect the respective information carriers from 0 to 20 m with information carrier basic technologies that partially overlap in terms of range. As a result, the redundancy with regard to data contents increases in the event of a defect and/or loss of individual information carriers.

Furthermore, it is preferred that the information carrier has at least one cover layer that overlaps the substrate and/or the electrically conductive layers completely or partially. The cover layer preferably is an electrically non-conductive layer, preferably a paper layer, a film layer, a paint layer, a lacquer layer and/or combinations thereof. This layer can perform a plurality of functions, comprising protection of the information carrier against external influences or obliteration. In the meaning of the invention, said layer can in particular be designated as a cover layer and can also be used as a substrate.

The antenna, in particular the information carrier, is preferably used as an RFID transponder, wherein the antenna preferably is a resonance-adjusting structure and is present such that it is brought in a spatial vicinity of 0-3 cm of an impedance-adjusting coil and at least one microchip electrically connected thereto. Thus, the information carrier comprises a touch structure and an antenna. Preferably, a transponder is coupled to the antenna. In a further preferred embodiment, the components of the transponder in the form of the coil and the microchip can also be applied onto the substrate with the antenna. Advantageously, the coil can also be applied by using the printing method which was used for producing the information carrier.

It is preferred that the coil and/or the microchip are arranged on a separate intermediate carrier, and the intermediate carrier is preferably implemented in a self-adhesive manner. In the self-adhesive embodiment, the intermediate carrier can be fixed on the substrate in a particularly simple manner.

In a further preferred embodiment, the antenna is arranged on or at a first article, and the coil comprising at least one microchip electrically connected thereto is arranged on or at a second article, wherein the articles are present such that they are brought in a spatial vicinity of 0-3 cm. Thus, an effective transponder is created only through an intended or unintended approach of the components. Preferably, the antenna can be an integral part of packaging while the coil comprising the microchip is attached to an article for which the packaging is provided. By bringing the article and the packaging together, a complete RFID transponder is formed.

It is preferred that on the substrate at least one layer is present that can be read with a capacitive reader. With the additionally applied layer, advantageously, a multi-readable information carrier can be implemented. In the meaning of the invention, the applied layer can in particular be designated as information layer. Preferably, this layer is also a structurally applied layer. Advantageously, this layer is applied in the same work step together with the touch structure and the antenna so that a very economically implemented multiple information carrier is available. Advantageously, a capacitive reader unit serves for decoding, detecting and/or reading the applied information carrier. For this, the active surfaces of the reader are in particular configured such that the information of the information carrier can be read with absolute certainty. Readers for capacitively reading an information carrier or data carrier are known to the person skilled in the art (e.g. U.S. Pat. No. 3,719,804). Possible readers comprise, for example, capacitive readers. Applying an inductive layer that can be read with an inductive reader can also be preferred. Combined reading (capacitive/inductive) of such information carriers can also be preferred.

Furthermore, it is preferred that on the substrate of the information carrier at least one optically readable structure, preferably a code, is applied. Thus, an optically readable structure in the form of a code can be a further preferred integral part of the information carrier so that a further multi-readable information carrier is implemented. A known optically readable data medium is, for example, a barcode, SNAP code, QR code or AR system (Augmented Reality). Hereby, the possibility for reading a preferred product is increased. This enables a continuous and redundant information access even if due to environmental influences such as dirt (problematic for barcode), metallic surfaces (problematic for RFID), etc. one of the information carriers cannot be read. Furthermore, selective information distribution among different basic technologies is possible. Thereby, antennas and/or information carriers are applied in already existing or new products without loss of time or special purpose machines. This includes, for example, packaging, wherein said can be used either for product security, product tracking and/or for increasing sales.

There is also the possibility to read the information carrier over rather large distances by means of the antenna-transponder arrangement. Ranges of up to 20 m or more are possible. In contrast, the layer readable with a capacitive reader can be read only in the near-field, (in particular a few millimeters). The same applies to inductive or optical codes which achieve a range of a few cm. A barcode can be read over several decimeters. These combinations of different reading methods and ranges allow a very complex utilization and employment of the information carrier without additional costs. Advantageously, the information carrier can be recognized by means of different physical reading methods.

In a further preferred embodiment, the information carrier is connected to at least one further electrical component, comprising a galvanic element, a capacitor arrangement and/or a chip. The galvanic element advantageously runs to an active or at least semi-active information carrier. Thus, it is also possible with the information carrier to carry out an active data management so that the field of use can be significantly expanded.

Furthermore, it is preferred that the information carrier is used as a multi-frequency-capable RFID transponder, wherein on or at the substrate at least one further RFID transponder of a further frequency range is arranged. Thus, multiple RFID systems can be implemented as information carriers in which an RFID transponder can be read over a relatively large distance, while the other RFID transponder, due to the frequency and functional principle, has a significantly shorter range. Through this, UHF and also HF frequency bands can be utilized on an information carrier, which represents a further advantage.

The information carrier preferably can be at the same time an integral part of packaging and/or an article and/or can be arranged on them. Advantageously, the information carrier can be connected to an article, or the article itself can serve as a substrate. The information carrier can be applied on easily displaceable articles, wherein the surfaces of the articles do not have to be even. The articles, in particular the surfaces of the articles, can serve as a substrate onto which the electrically conductive layer is printed. This results in many different possibilities of use of the information carrier.

It is preferred that the information carrier is used for the purpose that the information carrier is at least part of an illustration, decoration layer and/or visual refinement. Advantageously, in the case of numbers, letters or characters, this can be implemented in a fast and simple manner. An example is a word with T, wherein either the crossbar or the longitudinal bar can be the antenna at the same time, and subareas of the longitudinal bar or the crossbar can be the touch structure. Furthermore, such an illustration can advantageously be used as a quality and authenticity feature, wherein this is a result of the functionality of the information carrier.

The invention also relates to a group of information carriers comprising a plurality of information carriers, wherein at least one paint layer, adhesive layer, paper layer and/or film is applied in each case at least as a background, cover, number, letter, character, graphic illustration and/or pictorial illustration or a combination thereof, wherein a plurality of information carriers have a first layer and a second layer that are identical in terms of information technology and at least one identically configured paint layer so that a self-contained group of information carriers is implemented, which information carriers are identical in terms of information technology and optical appearance, a plurality of information carriers have a first layer and a second layer that are identical in terms of information technology and at least one differently configured paint layer so that a group of information carriers is implemented, which information carriers are identical in terms of information technology, but are different in terms of optical appearance, a plurality of information carriers have a first layer and a second layer that are different in terms of information technology and at least one identically configured paint layer so that a group of information carriers is implemented, which information carriers are unique in terms of information technology, but are identical in terms of optical appearance, a plurality of information carriers have a first layer and a second layer that are different in terms of information technology and at least one differently configured paint layer so that information carriers are implemented that are unique in terms of information technology and optical appearance.

The group of information carriers can also be read by means of a device comprising an area sensor. Advantageously, the group of information carriers can be combined with each other, wherein a plurality of information carriers can also be positioned one above the other or next to one another on an area sensor and can be read in this manner.

The invention shall be explained hereinafter with reference to the figures, but without being limited thereto. In the figures.

An assembly in a first exemplary embodiment consists substantially of a structured layer of an adhesive and a transfer layer arranged thereon as an antenna 2 on an electrically non-conductive substrate 1. The antenna is configured as UHF dipole antenna and has two dipole ends that are spaced apart from each other. Here, 2 different geometries are exemplary implemented as an antenna 2.

For fabricating an assembly, a transfer film method in the form of a cold film method is used in a second exemplary embodiment. It is particularly preferred here to apply a structured adhesive onto the electrically non-conductive substrate 1. Structuring and applying adhesives can be carried out in a technically very simple manner, in contrast to the at least partial removal of structures from a holohedral material. The latter is carried out in most cases through wet-chemical processes such as etching and is therefore very limited in terms of substrate selection and medium to be applied, and thus is disadvantageous. Furthermore, structuring the adhesive has the advantages that layout changes or changes of the data structure can be carried out in a very flexible manner. In a particularly preferred variant of offset printing, this is done by replacing an offset plate or offset blanket.

In a further embodiment, the adhesive is first applied onto the transfer film and subsequently, this at least partially adhesive transfer film is brought in contact with the substrate 1.

It is particularly advantageous if the UHF dipole antenna and/or the capacitive information carrier 8 is part of a printed product, for example packaging 4. The packaging 4 can be used, for example, for foodstuff, jewelry, cosmetics, or can be used in the medical field for transporting important drugs or even organs. Advantageously, the use of the invention is possible and advantageous in all fields in which information is to be read by means of RFID technology and/or capacitive reading technology.

Figure 1A:
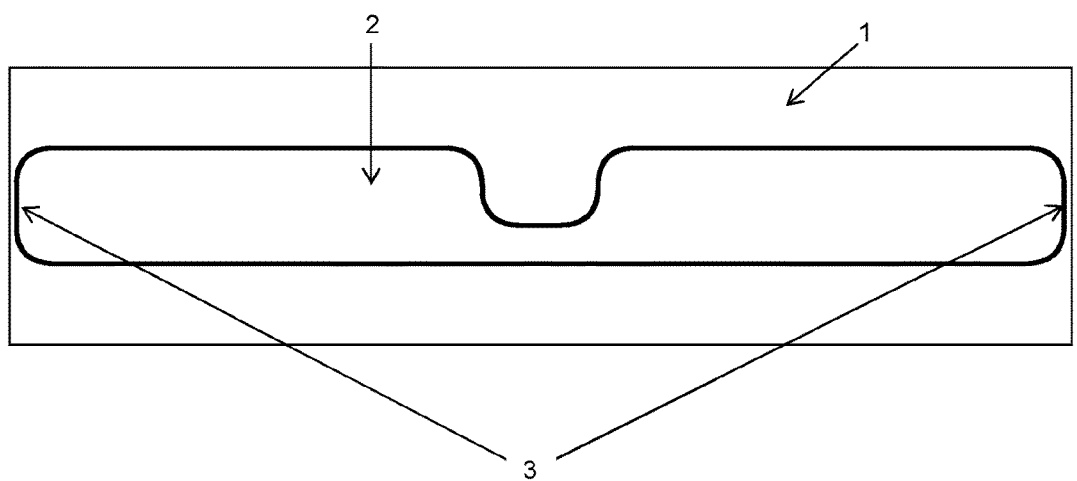
FIG. 1 shows a UHF dipole antenna in different geometries.
Figure 1B:
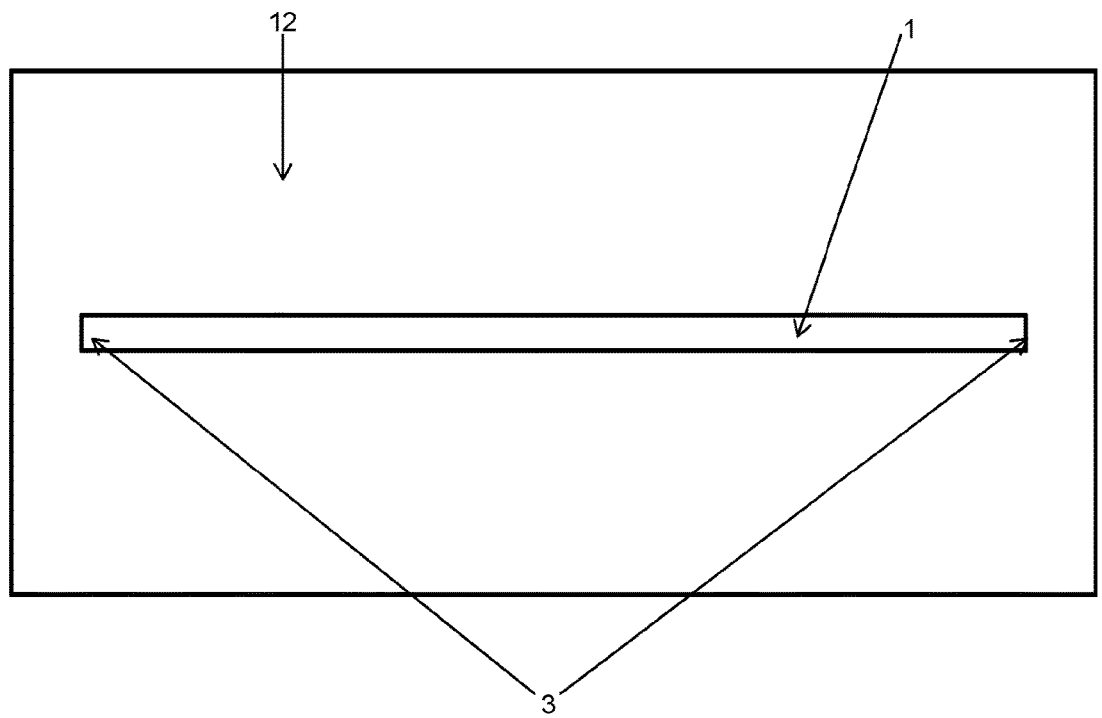

FIG. 1 shows two different geometries of antennas 2 in a schematic illustration. On the electrically non-conductive substrate 1, at least one structured layer of an adhesive is arranged, and on this layer, at least one electrically conductive transfer layer is arranged as the antenna 2. FIGS. 1a and 1b show as an example different geometries of antennas 2. In FIG. 1b, the antenna 2 is implemented as a UHF slotted waveguide antenna 12. Advantageously, the transfer layer is an integral part of a transfer film. Another integral part of the transfer film is a carrier of the transfer layer. The connection of the two integral parts is formed in such a manner that the adhesiveness of the structured adhesive layer is higher than the cohesiveness of the transfer layer and the adhesiveness of the substrate 1. The transfer layer preferably consists of particles or contains particles that consist of metal, at least one metal alloy, graphite, a dielectric substance, in each case individually or in at least one combination. The antennas 2 are preferably applied onto articles or packaging 4, wherein for increasing sales, the visual refinement is supplemented at the same time by the antenna 2, for example, for securing the product. Thus, a cost-neutral antenna 2 is produced that is implemented without additional expenses. In a particularly preferred embodiment, it is even possible to implement the visual refinement as an antenna 2. The electrically non-conductive substrate 1 preferably is a carrier medium which, for example, consists of paper, cardboard, a wooden material, rubber, glass, a composite material, a plastic, a biodegradable plastic, at least one cellulose derivative, at least one starch derivative or at least one combination thereof. Of course, particularly advantageous are degradable substrates 1. Particularly preferred, the paper is made from cellulose or mechanical pulp from wood pulp. The paper can be present, for example, in the form of cardboard or paperboard. For these applications, cardboard is a material made from cellulose or recovered paper by glueing or pressing it together. The cardboard can involve a paper body that is glued together from three or more layers, wherein the cover layers and the middle inserts have the same or a different composition in that, for example, the cover layers are made from wood-free substances and the middle inserts are provided from wood-containing substances.

Another preferred substrate 1 is plastic. Preferably, this can involve polyethylene, polypropylene, polyvinyl chloride, polystyrene, polycarbonate, polyurethane, PVDF, polyethylene terephthalate or copolymers of the aforementioned. Using biodegradable films made from corn starch or cellulose derivatives can also be preferred.

The functional layers for the antenna 2, the information layer in the form of a capacitive information carrier 8 and/or the optical layer in the form of an optical code 9 can preferably be metals or metal-containing substances such as, for example, cold films with an aluminum layer or other transfer layers, or the already mentioned dielectric materials, or graphite and soot. Completely surprising, a very good electrical conductivity is not necessarily required for this application. Positive results could be achieved even with sheet resistances of more than 100Ω/□. In the meaning of the invention, the electrical conductivity can in particular also be designated as conductivity. Preferred metals or metal-containing substances comprise aluminum, lead, iron, gold, copper, magnesium, wolfram, zinc or tin. Of course, it is also possible that the metals or metal-containing substances comprise elements such as chromium, molybdenum or other elements. Dielectric materials are any poorly conductive or non-conductive, non-metallic substances, the charge carriers of which are generally freely movable. This can involve, for example, electrically conductive plastics such as PEDOT and PANI. It is particularly preferred if the layer is applied in the form of the antenna 2 and/or as a capacitive information carrier 8, the latter as capacitance or inductance, onto the non-conductive substrate 1 by means of cold film technology or cold film stamping. Of course, instead of cold film technology, it is also possible to use methods by means of hot film stamping machines or the like. Particularly preferred is cold film technology.

As adhesives, permanently as well as temporarily bonding adhesives can be used. Aqueous and also solvent-containing adhesives are suitable for structuring and locally removing the transfer layer, as well as physically or chemically setting adhesives. The term adhesive in the meaning of the invention comprises in particular also sticky materials that are of authentic organic origin, which the person skilled in the art designates as glue. Particularly preferred are physically setting adhesives for offset printing machines. The physical effects preferably comprise temperature but also light sources such as, for example, UV light. Furthermore, electrically conductive adhesives can also be used, if required.

In a further embodiment, the assembly consists of a resonant structure in the form of the antenna 2 and an impedance-adjusting structure in the form of a coil 5 comprising at least one microchip 6 electrically connected thereto, wherein the coil 5 and the microchip 6 are located on an intermediate carrier.

Figure 2:
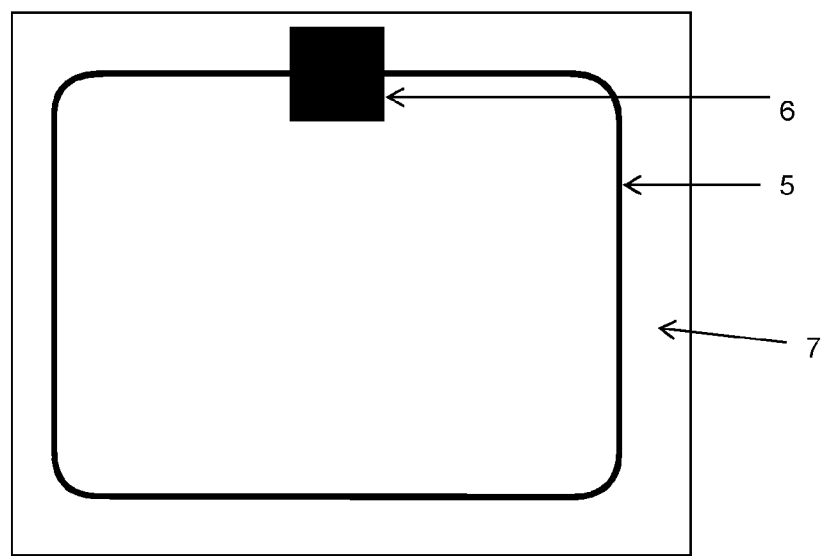
FIG. 2 shows a coil and a microchip as an impedance-adjusting structure.

FIG. 2 shows a coil 5 and a microchip 6 in a schematic illustration on an intermediate carrier 10. The material of the intermediate carrier 10 is selected from the substrate materials and is preferably provided in a self-adhesive manner.

Figure 3A:
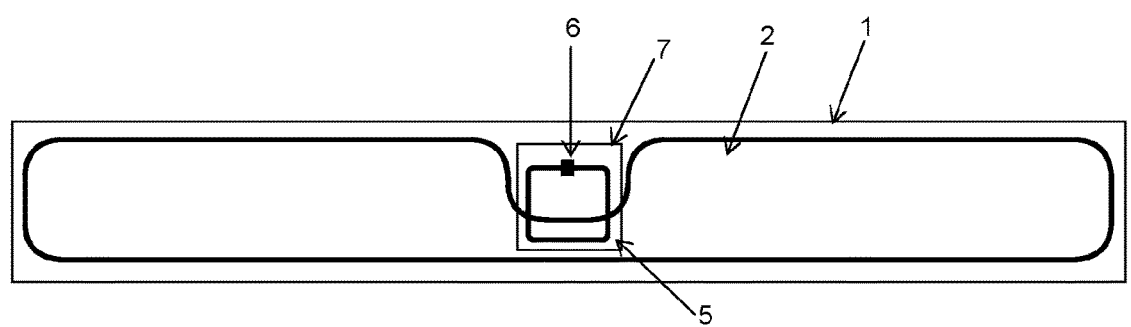
FIG. 3 shows possibilities of arranging the UHF dipole antenna and the coil with microchip.
Figure 3B:
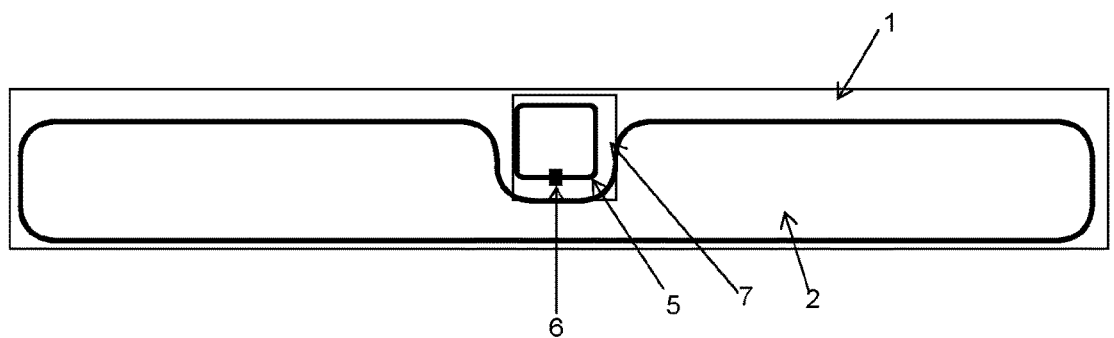
Figure 3C:
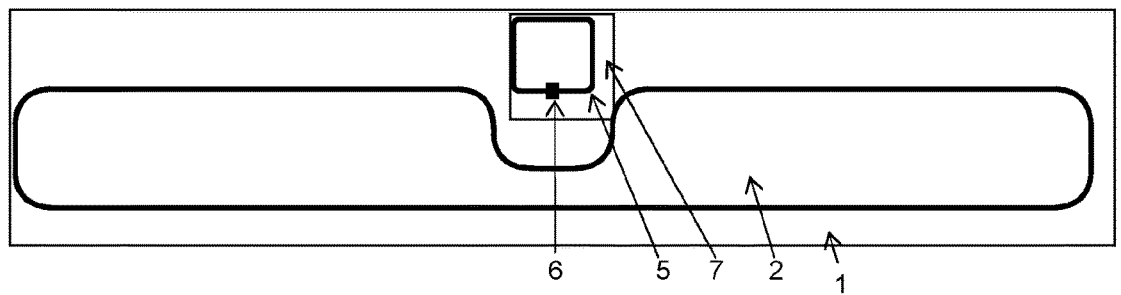

FIGS. 3a to c show antennas 2 having a resonant structure in connection with a coil 5 and a microchip 6 as an impedance-adjusting structure in schematic illustrations. Therewith, preferably, an RFID transponder can be implemented.

FIG. 4 shows assemblies on a packaging 4 in schematic illustrations.

Figure 4A:
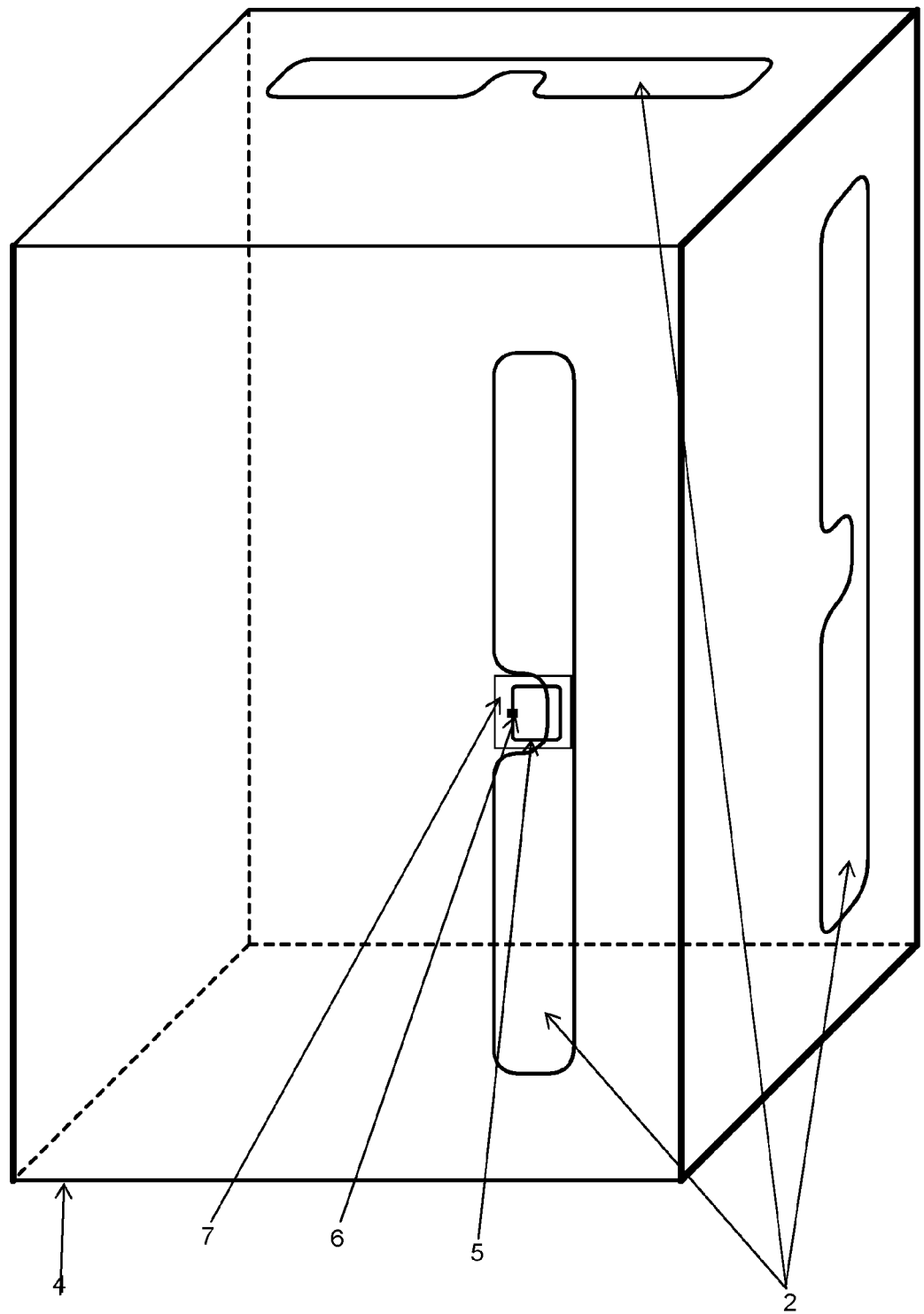
FIG. 4 shows assemblies on packaging.

FIG. 4a shows packaging 4 with antennas 2 on different surfaces of the packaging 4. One antenna 2 is equipped with a coil 5 and a microchip 6 on an intermediate carrier 7.

Figure 4B:
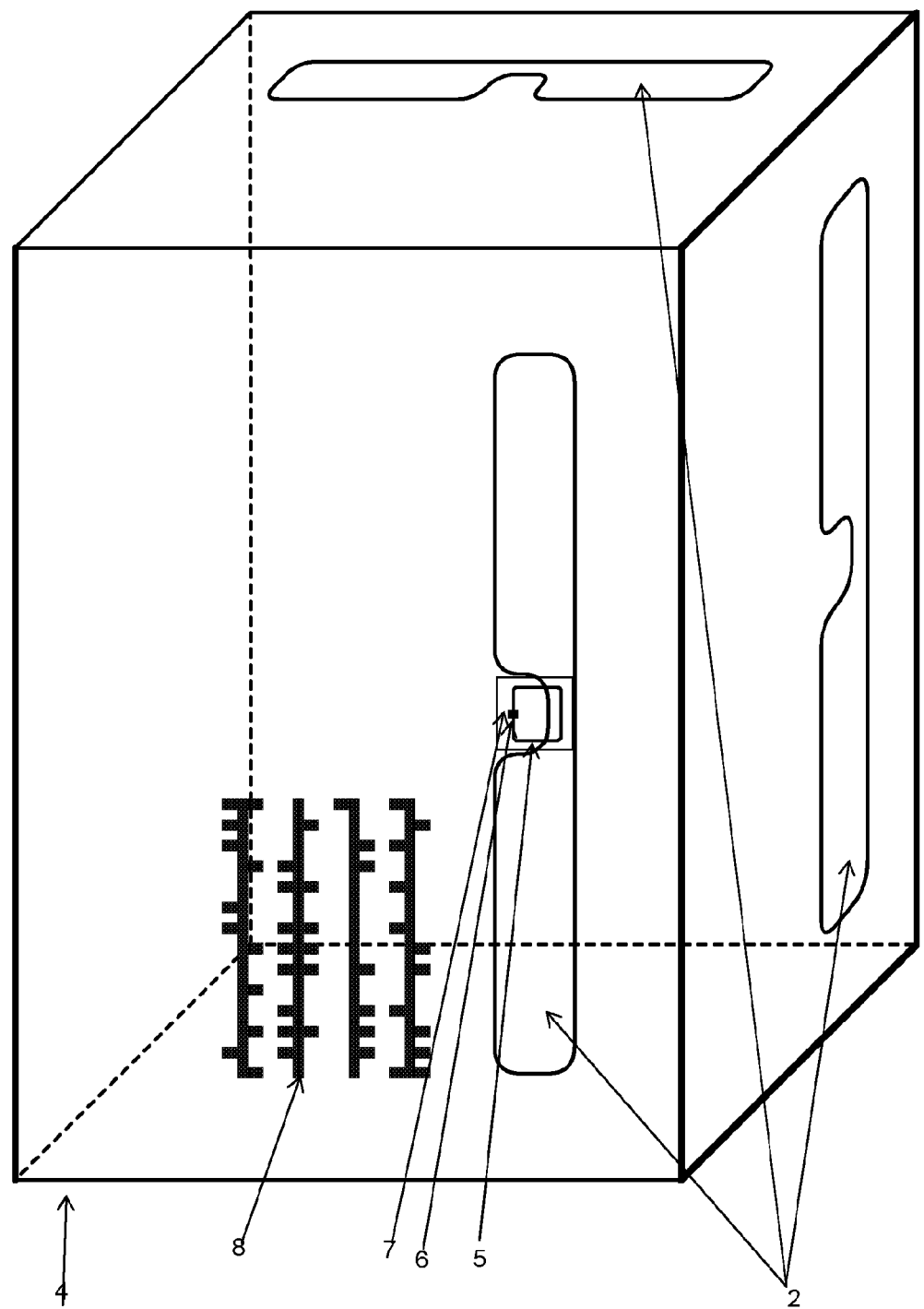

FIG. 4b shows packaging 4 with antennas 2 on different surfaces of the packaging 4. One antenna 2 is equipped with a coil 5 and a microchip 6 on an intermediate carrier 7. In addition, the packaging 4 has a capacitive information carrier 8. The capacitive information carrier represents a capacitively readable structure so that advantageously, a multi-readable information carrier can be implemented.

Figure 4C:
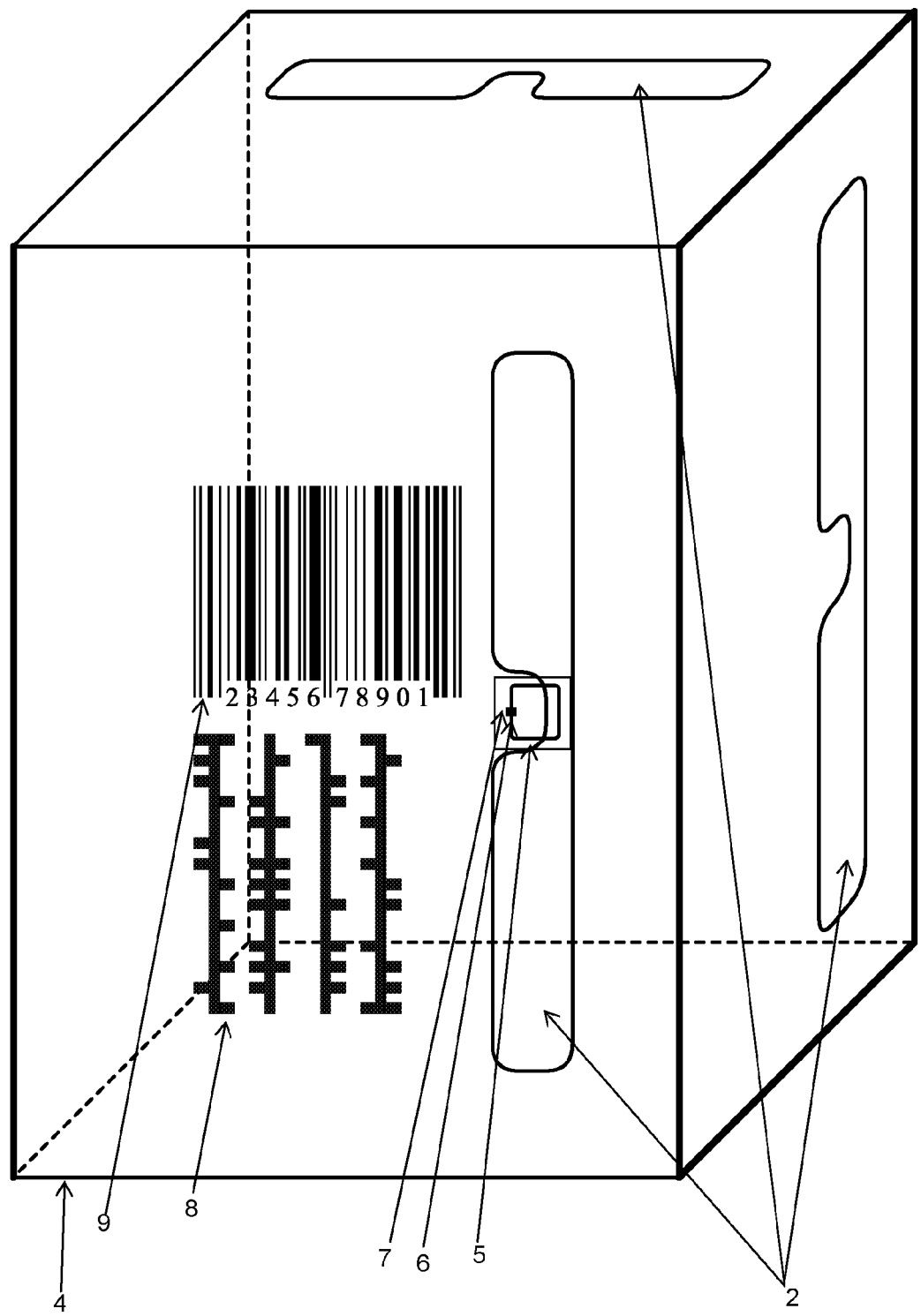

FIG. 4c shows packaging 4, which, in addition to FIG. 4b, has a barcode as an optical code 9. The barcode represents an optically readable structure so that a further multi-readable information carrier is implemented.

Figure 4D:
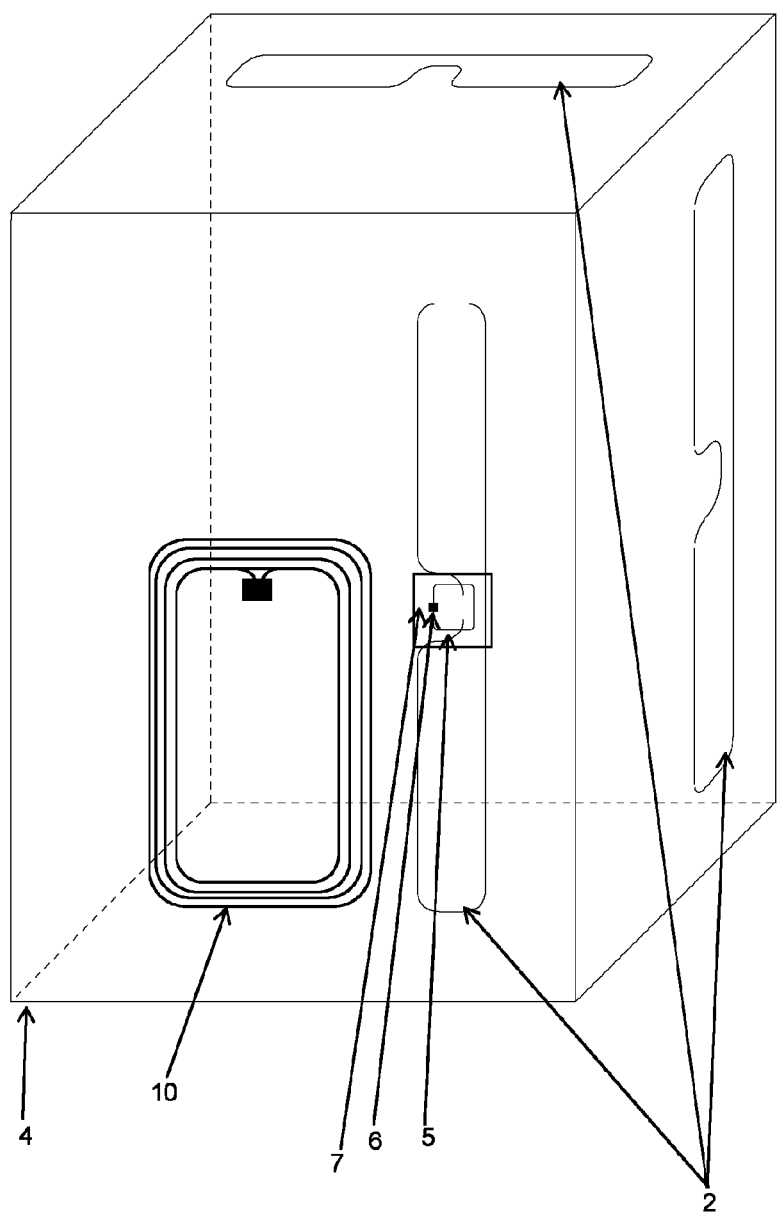

FIG. 4d shows in a schematic illustration a packing 4, wherein next to the arrangement of a coil 5 with a microchip 6, a further RFID transponder of a further frequency range 10 is arranged on a UHF dipole antenna. Therewith, advantageously, a multi-readable RFID transponder can be implemented. The data content of the information carrier of these embodiments is assigned to identical or different data contents of a storage.

Figure 5A:
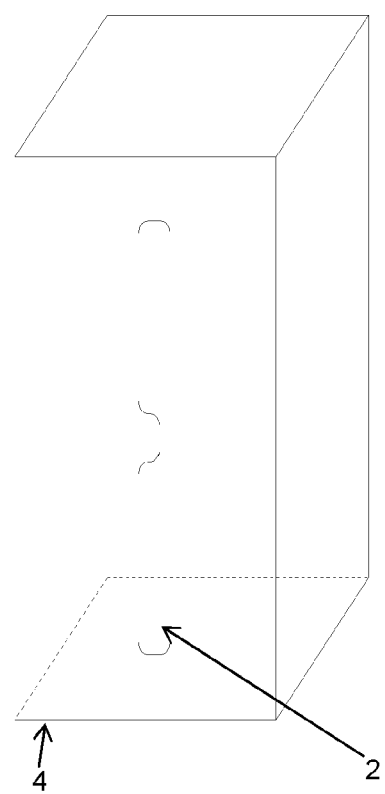
FIG. 5 shows an UHF dipole antenna and a coil with microchip on separate articles, FIG. 6A)-C) show preferred embodiments of the information carrier, FIG. 7A)-D) show further embodiments of the information carrier.
Figure 5B:
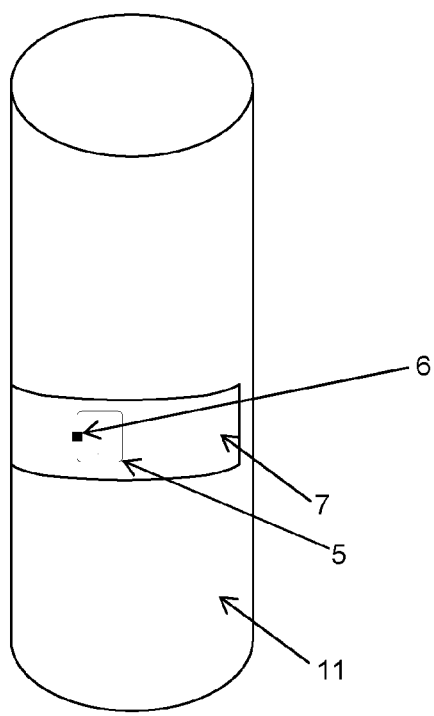
Figure 5C:
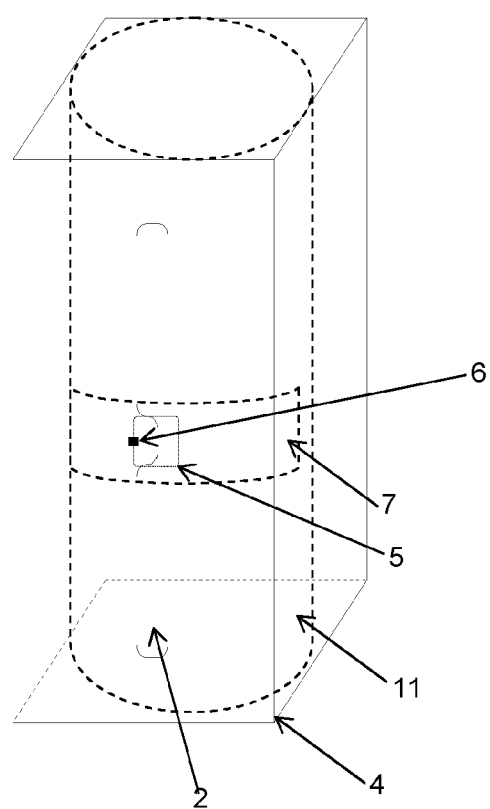

FIG. 5a shows packaging 4 with a UHF dipole antenna 2. FIG. 5b shows an article 11 with a coil 5 and a microchip 6 on an intermediate carrier 7. FIG. 5c shows the article 11 inside the packaging 4. Here, coil 5 and microchip 6 on the intermediate carrier 10 are in a vicinity of 0-3 cm to the packaging 4 with the UHF dipole antenna 2. Therewith, advantageously, a functional RFID transponder can be implemented. In a further embodiment, the assembly is connected to at least one further component on the substrate 1, wherein the component is a galvanic element and/or a capacitor arrangement and/or a chip. At least the assembly is provided with at least one protective cover layer. The cover layer preferably is an adhesive layer, a paint or lacquer layer or at least one combination thereof, or is a substrate 1. Advantageously, the substrate consists of paper, cardboard, a wooden material, a composite material, a plastic, a biodegradable plastic, at least one cellulose derivative, at least one starch derivative or at least one combination thereof. Particularly advantageous are naturally degradable substrates 1.

Figure 6:
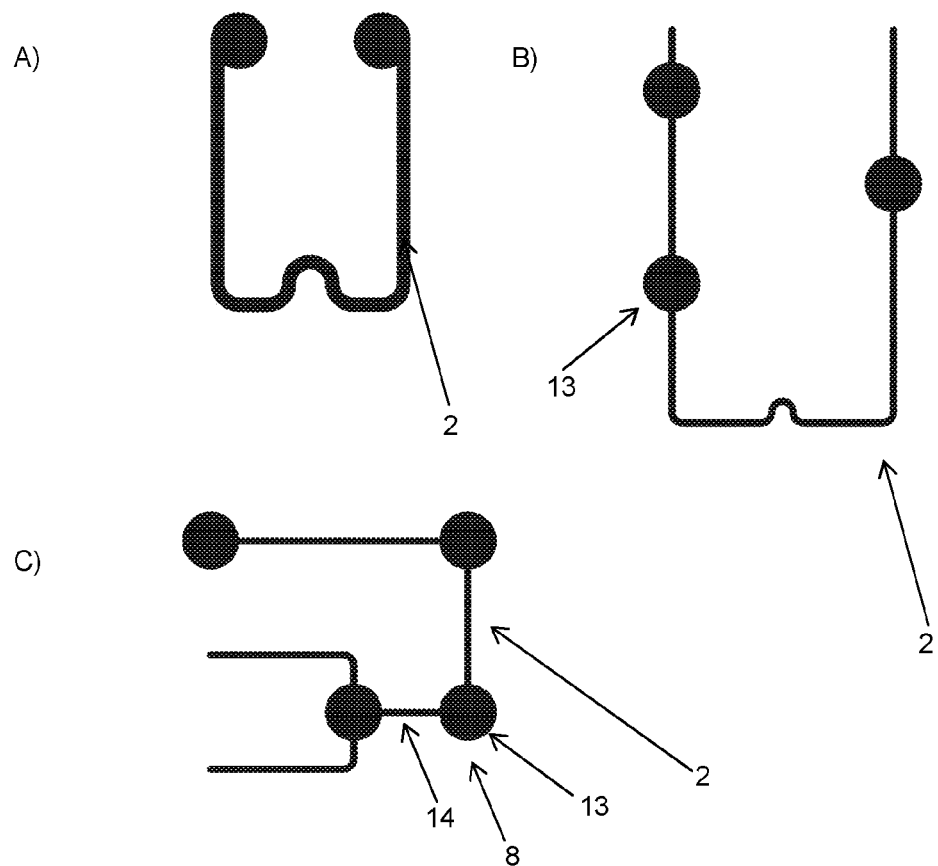

FIGS. 6A)-C) show preferred embodiments of the information carrier. The antenna 2 can be formed in different shapes on the substrate. In a preferred embodiment, the touch structure 8 and the antenna 2 lie on top of each other. Here, the touch structure 8 comprises the touch points 13 which preferably trigger an input on an area sensor. The touch points 13 can also be an integral part of the electrically conductive layer of the antenna 2, wherein the touch points 13 are connected to each other via conductor paths 14.

Figure 7:
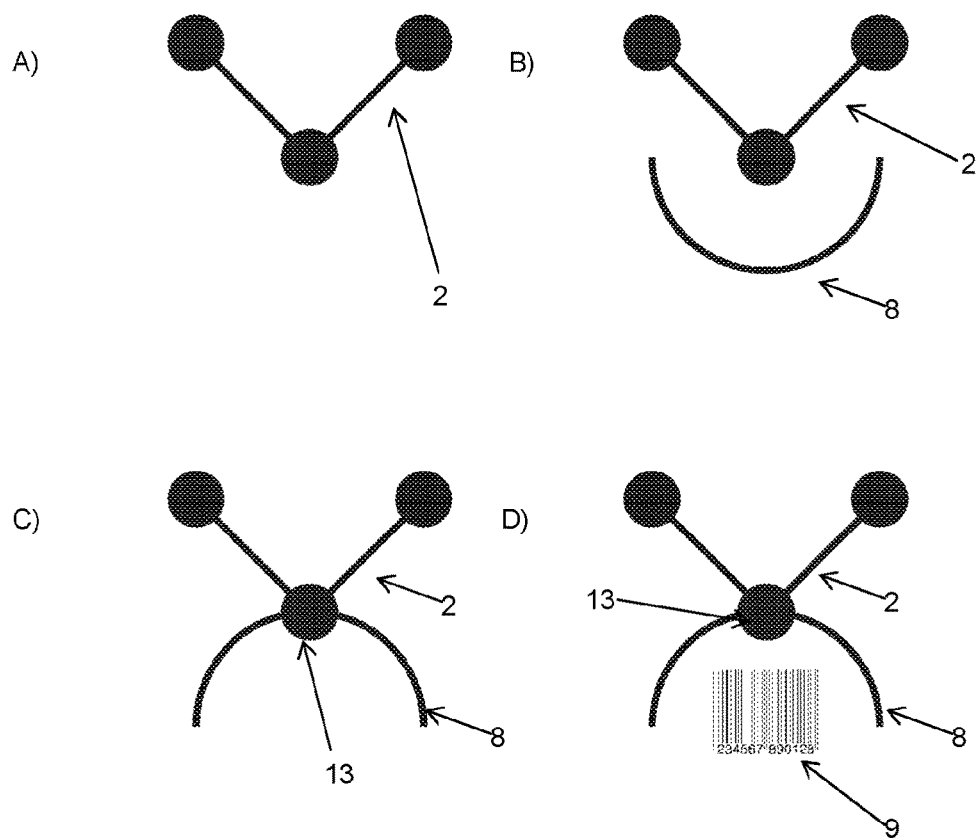

FIGS. 7A)-D) show further embodiments of the information carrier. The antenna 2 and the touch structure 8 can be arranged next to each other, overlappingly or congruently on the substrate. Moreover, the information carrier can be supplemented with further readable means such as, for example, an optically readable barcode 9. Hereby, a multi-readable information carrier is provided that comprises information or physical interfaces that can be read by means of different physical reading methods so that as result, the information carrier can be used universally and can be optimally adapted to special fields of use.

REFERENCE LIST

1 Substrate
2 Dipole antenna
3 Dipole ends
4 Packaging
5 Coil
6 Microchip
7 Intermediate carrier
8 Touch structure
9 Optical code
10 RFID transponder of a further frequency range
11 Article
12 UHF slotted waveguide antenna
13 Touch points
14 Conductor paths

The invention claimed is:

1. A multiple information carrier, comprising:
at least one electrically conductive layer, and
a non-conductive substrate, wherein:
 the at least one electrically conductive layer comprises a first electrically conductive layer present in at least one first area on the substrate, the first electrically conductive layer being configured as a touch structure comprising at least one coupling area for coupling an external electrical capacitance to the touch structure,
 the at least one electrically conductive layer further comprises a second electrically conductive layer present in at least one second area on the substrate, the second electrically conductive layer being configured as an antenna, and
 wherein the touch structure is readable with a capacitive touchscreen.

2. The multiple information carrier according to claim 1, wherein the at least one first area in which the touch structure is present is spatially separated from the at least one second area in which the antenna is present.

3. The multiple information carrier according to claim 1, wherein the first and second layers are present on the substrate in a structured manner, and wherein the first or second layer comprises one or more elements selected from a group consisting of a point, a straight line, a curve, and an area.

4. The multiple information carrier according to claim 1, wherein at least one optically readable layer is applied onto the substrate, the optically readable layer comprising a code.

5. The multiple information carrier according to claim 1, wherein an inductively, acoustically, magnetically, electromagnetically, and/or optically readable structure is applied onto the substrate.

6. The multiple information carrier according to claim 1, wherein the touch structure further comprises a touch point and/or a conductor path.

7. The multiple information carrier according to claim 1, wherein the substrate comprises one or more materials selected from a group consisting of plastics, paper, cardboard, wooden material, composite material, glass, ceramics, textiles, and leather.

8. The multiple information carrier according to claim 1, wherein the information carrier has at least one cover layer that completely or partially covers the substrate and/or the electrically conductive layers.

9. The multiple information carrier according to claim 1, wherein the information carrier is disposed on an article.

10. The multiple information carrier according to claim 1, wherein the first and second layers are layers generated on the substrate via one or more methods selected from a group consisting of an additive method, a semi-additive method, and/or a subtractive method.

11. The multiple information carrier according to claim 1, wherein the antenna is in a spatial vicinity of 0-3 cm of an impedance-adjusting coil and at least one microchip electrically connected to the coil.

12. The multiple information carrier according to claim 11, wherein the coil and/or the microchip are arranged on a separate intermediate carrier, and the intermediate carrier is self-adhesive.

13. The multiple information carrier according to 12, wherein the antenna is arranged on a first article, and the coil and the at least one microchip electrically connected to the coil are arranged on a second article, and wherein the first and second articles are at most 3 cm apart.

14. The multiple information carrier according to claim 1, wherein the information carrier is connected to at least one further electrical component comprising a galvanic element, a capacitor arrangement, and/or a chip.

15. The multiple information carrier according to claim 1, further comprising at least one RFID transponder arranged on the substrate, where the antenna is configured to operate at a first frequency range and the at least one RFID transponder is configured to operate at a second frequency range.

* * * * *